US012754309B2

(12) United States Patent
Sur et al.

(10) Patent No.: US 12,754,309 B2
(45) Date of Patent: Oct. 6, 2026

(54) HUMAN-PERCEPTIBLE AND MACHINE-READABLE SHAPE GENERATION AND CLASSIFICATION OF HIDDEN OBJECTS

(71) Applicant: UNIVERSITY OF SOUTH CAROLINA, Columbia, SC (US)

(72) Inventors: Sanjib Sur, Cayce, SC (US); Hem K. Regmi, Columbia, SC (US)

(73) Assignee: University of South Carolina, Columbia, SC (US)

( * ) Notice: Subject to any disclaimer, the term of this patent is extended or adjusted under 35 U.S.C. 154(b) by 1128 days.

(21) Appl. No.: 17/726,279

(22) Filed: Apr. 21, 2022

(65) Prior Publication Data

US 2022/0373673 A1 Nov. 24, 2022

Related U.S. Application Data

(60) Provisional application No. 63/303,805, filed on Jan. 27, 2022, provisional application No. 63/192,345, filed on May 24, 2021.

(51) Int. Cl.

| | |
|---|---|
| ***G01S 13/88*** | (2006.01) |
| ***G01S 13/90*** | (2006.01) |
| ***G06N 3/04*** | (2023.01) |
| ***G06N 3/08*** | (2023.01) |

(Continued)

(52) U.S. Cl.

CPC ........ *G01S 13/887* (2013.01); *G01S 13/9004* (2019.05); *G06N 3/04* (2013.01); *G06N 3/08* (2013.01); *G06V 10/764* (2022.01); *G06V 10/774* (2022.01)

(58) Field of Classification Search

CPC .... G01S 13/887; G01S 13/9004; G01S 7/417; G06N 3/04; G06N 3/08; G06N 3/0455; G06N 3/0464; G06N 3/0475; G06N 3/048; G06N 3/09; G06N 3/094; G06V 10/764;

(Continued)

(56) References Cited

U.S. PATENT DOCUMENTS

| | | | | |
|---|---|---|---|---|
| 2021/0192762 A1* | 6/2021 | Guan | ..................... | G06V 20/64 |
| 2022/0026561 A1* | 1/2022 | Valdes Garcia | ....... | G06V 20/60 |

OTHER PUBLICATIONS

Guan et al, High Resolution Millimeter Wave Imaging for Self-Driving Cars, 2019, arXiv:1912.09579v2, pp. 1-14. (Year: 2019).*

(Continued)

*Primary Examiner* — Kathleen M Broughton
(74) *Attorney, Agent, or Firm* — Dority & Manning, P.A.

(57) ABSTRACT

System and methodology are disclosed for approximating traditional SAR imaging on mobile mmWave devices. The presently disclosed technology enables human-perceptible and machine-readable shape generation and classification of hidden objects on mobile mmWave devices. The resulting system and corresponding methodology are capable of imaging through obstructions, like clothing, and under low visibility conditions. To this end, the presently disclosed technology incorporates a machine-learning model to recover the high-spatial frequencies in the object to reconstruct an accurate 2D shape and predict its 3D features and category. The technology is disclosed in particular for security applications, but the broader model disclosed is adaptable to different applications, even with limited training samples.

46 Claims, 8 Drawing Sheets

(51) Int. Cl.
*G06V 10/764* (2022.01)
*G06V 10/774* (2022.01)

(58) Field of Classification Search
CPC ................ G06V 10/774; G06V 10/82; G06V 2201/05; G06V 20/52
See application file for complete search history.

(56) References Cited

OTHER PUBLICATIONS

Sharma et al, Towards a CNN coupled mmWave coded aperture image classifier system, 2021, SPIE Defense and Commercial Sensing, pp. 1-11. (Year: 2021).*
Lu et al, See Through Smoke: Robust Indoor Mapping with Low-cost mmWave Radar, 2020, arXiv:1911.00398v2, pp. 1-14. (Year: 2020).*
Hamidi et al, 3D Near-Field Millimeter-Wave Synthetic Aperture Radar Imaging, 2021, IEEE 19th Internation Symposium on Antena Technomogy and Applied Electromagnetics, pp. 1-2. (Year: 2021).*
Sheen et al., Three-Dimensional Millimeter-Wave Imaging for Concealed Weapon Detection, 2001, IEEE Transactions on Microwave Theory and Techniques (49) 9: 1581-1592. (Year: 2001).*
Nguyen et al., 3D imaging for millimeter-wave forward-looking synthetic aperture radar (SAR), 2020, SPIE Defense and Commercial Sensing, pp. 1-13. (Year: 2020).*
Adib et al., 3D Tracking via Body Radio Reflections, 11$^{th}$ USENIX Symposium on Networked Systems Design and Implementation, 2014, 315-329. https://www.usenix.org/system/files/conference/nsdi14/nsdi14-paper-adib.pdf.
Adib et al., See Through Walls with Wi-Fi! SIGCOMM '13: Proceedings of the ACM SIGCOMM 2013 Conference on SIGCOMM, 2013 75-86. https://doi.org/10.1145/2486001.2486039 https://dl.acm.org/doi/pdf/10.1145/2401.2486039.
Adib et al., Capturing the Human Figure Through a Wall, ACM Transactions on Graphics, vol. 34, No. 6, Article 219, 2015, 219.1-219.13. https://people.csail.mit.edu/hongzi/content/publications/RFcapture-TOG.pdf https://people.csail.mit.edu/hongzi/content/publications/RFcapture-TOG.pdf.
Ahn et al., Convolutional Neural Networks Using Skip Connections with Layer Groups for Super-Resolution Image Reconstruction Based on Deep Learning, Applied Sciences, vol. 10, No. 6, 2020, 1959, 10 Pages. https://doi.org/10.3390/app10061959.
Badrinarayanan et al., SegNet: A Deep Convolutional Encoder-Decoder Architecture for Image Segmentation, IEEE Transactions on Pattern Analysis and Machine Intelligence, vol. 39, Issue 12, 2017, 2481-2495. https://doi.org/10.1109/TPAMI.2016.2644615.
Hsu et al., Extracting Gait Velocity and Stride Length from Surrounding Radio Signals, CHI '17: Proceedings of the 2017 CHI Conference on Human Factors in Computing Systems, Association for Computing Machinery, 2017, 2116-2126. https://doi.org/10.1145/3025453.3025937.
Gomez, Understanding Categorical Cross-Entropy Loss, Binary Cross-Entropy Loss, SOftmax Loss, Logistics Loss, Focal Loss and all those Confusing Names, 2018, 23 Pages. https://gombro.github.io/2018/05/23/cross_entropy_loss/.
Goodfellow et al., Generative Adversarial Networks, Machine Learning, Neural Information Processing Systems, 2014, 9 Pages. https://doi.org/10.48550/arXiv.1406.2661.
Guan et al., Through Fog High-Resolution Imaging Using Millimeter Wave Radar, 2020 IEEE/CVF Conference on Computer Vision and Pattern Recognition (CVPR), 2020, 11464-11473. https:/doi.org/10.1109/CVPR42600.2020.01148.
Isola et al., Image-to-Image Translation with Conditional Adversarial Networks, 2017 IEEE Conference on Computer Vision and Pattern Recognition (CVRP), 2017, 1125-1134. https://doi.org/10.1109/CVPR.2017.632.
Kajbaf et al., Improving Efficiency of Microwave Wideband Imaging Using Compressed Sensing Techniques, Materials Evaluation, vol. 70, No. 12, 2012, 1420-1432. (Abstract Only) https://ndtlibrary.asnt.org/scholar/access/2012/ImprovingEfficiencyofMicrowaveWidebandImagingusingCompressedSensingTechniques.pdf.
Ledig et al., Photo-Realistic Single Image Super-Resolution Using a Generative Adversarial Network, Proceedings of the IEEE Conference on Computer Vision and Pattern Recognition (CVPR), 2017, 4681-4690. https://openaccess.thecvf.com/content_cvpr_2017/papers/Ledig_Photo-Realistic_Single_Image_CVPR_2017_paper.pdf.
Li et al., Point Cloud Gan, Iclr 2019, 18 Pages. https://arxiv.org/abs/1810.05795.
Lin, Microwave and Millimeter-Wave Remote Sensing for Security Applications, By Jeffrey A. Nanzer, Artech House, Remote Sensing, vol. 5, Issue 1, 2013, 367-373. https://www.researchgate.net/publication/258811562_Microwave_and_Millimeter-Wave_Remote_Sensing_for_Security_Applications_By_Jeffrey_A_Nanzer_Artech_House_2012_372_pages_Price_10900_ISBN_978-1-60807-172-2.
Mamandipoor et al., 60 GHz Synthetic Aperture Radar for Short-Range Imaging: Theory and Experiments, 2014 48th Asilomar Conference on Signals, Systems and Computers, 2014. https://wcsl.ece.ucsb.edu/sites/default/files/publications/babak_asilomar_2014.pdf https://doi.org/10.1109/ACSSC.2014.7094506.
Mirza et al., Conditional Generative Adversarial Nets, 2014, 7 Pages. https://arxiv.org/pdf/1411.1784.pdf.
Nannuru et al., Radio-Frequency Tomography for Passive Indoor Multitarget Tracking, IEEE Transactions on Mobile Computing, vol. 12, Issue 12, 2013, 2322-2333. https://doi.org/10.1109/TMC.2012.190.
Redecomposition Word Press, See Through Wall Radar Imaging Technology, 43 Pages. Retrieved Mar. 23, 2023 from website: https://redecomposition.wordpress.com/technology/.
Sheen et al., Three-Dimensional Millimeter-Wave Imaging for Concealed Weapon Detection, IEEE Transactions on Microwave Theory and Techniques, vol. 49, Issue 9, 2001, 1581-1592. (Abstract Only) https://doi.org/10.1109/22.942570.
Smith et al., Improved Adversarial Systems for 3D Object Generation and Reconstruction, 2017, 10 pages. http://proceedings.mlr.press/y78/smith17a/smith17a.pdf.
Smulders, Statistical Characterization of 60-GHz Indoor Radio Channels, IEEE Transactions on Antennas and Propagation, vol. 57, Issue 10, 2009, 2820-2829. https://doi.org/10.1109/TAP.2009.2030524.
Soumekh, A System Model and Inversion for Synthetic Aperture Radar Imaging, IEEE Transactions on Image Processing, vol. 1, Issue 1, 1992, 64-76. (Abstract Only) https://doi.org/10.1109/83.128031.
Soumekh, Synthetic Aperture Radar Signal Processing with MATLAB Algorithms, 1999, 648 Pages Book. Abstract Retrieved Mar. 20, 2023 from webpage: https://www.wiley.com/en-us/Synthetic+Aperture+Radar+Signal+Processing+with+MATLAB+Algorithms-p-9780471297062.
Thales Intersense, IS-900 System. Mar. 21, 2023 Available Online from webpage: https://www.intersense.com/is-900-system.
Tian et al., RF-Based Fall Monitoring Using Convolutional Neural Networks, Proc. ACM Interact. Mob. Wearable Ubiquitous Technol., vol. 2, No. 3, Article 137, 2018, 24 pages. https://doi.org/10.1145/3264947.
Transportation Security Administration Press Office (TSA), TSA Takes Next Steps to Further Enhance Passenger Privacy, Jul. 2011. Content Archived from weblink: https://www.tsa.gov/news/releases/2011/07/20/tsa-takes-next-steps-further-enhance-passenger-privacy.
Transportation Security Administration (TSA), What Can I Bring? Retrieved Mar. 21, 2023 online at https://www.tsa.gov/travel/security-screening/whatcanibring/all.
Wang et al., Image Quality Assessment: From Error Visibility to Structural Similarity, IEEE Transactions on Image Processing, vol. 13, Issue 4, 2004, 600-612. https://doi.org/10.1109/TIP.2003.819861.
Xiong et al., ArrayTrack: A Fine-Grained Indoor Location System, 10th USENIX Symposium on Networked Systems Design and Implementation (NSDI '13), 2013, 71-84. https://www.usenix.org/systemconference//nsdi13/nsdi13-final51.pdf.

(56) References Cited

OTHER PUBLICATIONS

Xu et al., Spatial and Temporal Characteristics of 60-GHz Indoor Channels, IEEE Journal on Selected Areas in Communications, vol. 20, Issue 3, 2002, 620- 630. https://doi.org/10.1109/49.995521.
Yanik et al., Near-Field MIMO-SAR Millimeter-Wave Imaging with Sparsely Sampled Aperture Data, IEEE Access, vol. 7, 2019, 31801-31819. https://doi.org/10.1109/ACCESS.2019.2902859.
Zhao et al., Loss Functions for Image Restoration with Neural Networks, IEEE Transactions on Computational Imaging, vol. 3, Issue 1, 2017, 47-57. https://doi.org/10.1109/TCI.2016.2644865.
Zhu et al., Reusing 60GHz Radios for Mobile Radar Imaging, MobiCom '15: Proceedings of the 21st Annual International Conference on Mobile Computing and Networking, 2015, 103-116. https://doi.org/10.1145/2789168.2790112 https://sites.cs.ucsb.edu/~ravenben/publications/pdf/60gradar-mobicom15.pdf.

* cited by examiner

Actual Shape mmWave-generated Shape

FIG. 7A
FIG. 7B
FIG. 7C
MilliGAN
Traditional SAR
Camera image

HUMAN-PERCEPTIBLE AND MACHINE-READABLE SHAPE GENERATION AND CLASSIFICATION OF HIDDEN OBJECTS

PRIORITY CLAIMS

The present application claims the benefit of priority of U.S. Provisional Patent Application No. 63/192,345, titled Human-Perceptible and Machine-Readable Shape Generation and Classification of Hidden Objects, filed May 24, 2021; and claims the benefit of priority of U.S. Provisional Patent Application No. 63/303,805, titled Human-Perceptible and Machine-Readable Shape Generation and Classification of Hidden Objects, filed Jan. 27, 2022, both of which are fully incorporated herein by reference for all purposes.

BACKGROUND OF THE PRESENTLY DISCLOSED SUBJECT MATTER

This disclosure deals with a system and method for approximating traditional SAR imaging on mobile millimeter-wave (mmWave) devices. The presently disclosed technology enables human-perceptible and machine-readable shape generation and classification of hidden objects on mobile mmWave devices. The resulting system and corresponding methodology are capable of imaging through obstructions, like clothing, and under low visibility conditions.

mmWave systems enable through-obstruction imaging and are widely used for screening in state-of-the-art airports and security portals[1, 2]. They can detect hidden contrabands, such as weapons, explosives, and liquids, by penetrating wireless mmWave signals through clothes, bags, and non-metallic obstructions[3]. In addition, mmWave imaging systems could enable applications to track beyond line-of-sight[4-7], see through walls[8-10], recognize humans through obstructions[10-12], and analyze materials without contaminating them[13]. mmWave systems also have advantages over other screening modalities, such as privacy preservation and low-light condition usages over optical cameras; very weak ionization effect over x-ray systems; and shape detection of non-metallic objects over metal detectors.

Furthermore, the ubiquity of mmWave technology in 5G-and-beyond devices enables opportunities for bringing imaging and screening functionalities to handheld settings. Hidden shape perception by humans or classification by machines under handheld settings will enable multiple applications, such as in situ security check without pat-down searches, baggage discrimination (i.e., without opening the baggage), packaged inventory item counting without intrusions, discovery of faults in water pipes or gas lines without tearing up walls, etc.

Traditional mmWave imaging systems operate under the Synthetic Aperture Radar (SAR) principle[14-19]. They use bulky, mechanical motion controllers or rigid bodies that move the mmWave device in a predetermined trajectory forming an aperture[1, 2, 14]. As it moves along the aperture, the device transmits a wireless signal and measures the reflections bounced off of the nearby objects. Combining all the reflected signals coherently across the trajectory allows the system to discriminate the objects with higher reflectivity against the background noise. The spatial resolution of the final 2D or 3D shape depends on the span of the apertures in horizontal and vertical axes and the bandwidth of the system[16, 20]. However, emulating the SAR principle on a handheld mmWave device is challenging for a key reason: mmWave signals are highly specular due to their small wavelength, i.e., many objects introduce mirror-like reflections[21, 22]. Thus, the effective strength of the reflections from various parts of the object depends highly on its orientation with respect to the aperture plane. So, even if some parts of the object could reflect mmWave signal strongly, those reflections may not arrive at the receiver. Consequently, some parts and edges of the object do not appear in the reconstructed mmWave shape.

In addition, due to the weak reflectivity of various materials, its reflected signals may be buried under the signals from strong reflectors. Thus, the weak reflecting parts of the object may have poor blurry resolution or may often be missing from the final shape completely, allowing for a partial shape reconstruction only. The resultant shape could lack discriminating features for automatic object classification, or it could be imperceptible by humans.

FIG. 1 shows some of the example shapes of hidden objects generated by a handheld mmWave system, as well as where the mmWave-generated shapes are imperceptible by humans.

Summary of the Presently Disclosed Subject Matter

Aspects and advantages of the presently disclosed subject matter will be set forth in part in the following description, or may be apparent from the description, or may be learned through practice of the presently disclosed subject matter.

Broadly speaking, the presently disclosed subject matter relates to human-perceptible and machine-readable shape generation and classification of hidden objects.

We propose MilliGAN, a system and corresponding methodology that approximates traditional SAR imaging on mobile mmWave devices. It enables human-perceptible and machine-readable shape generation and classification of hidden objects on mobile mmWave devices. The system and methodology are capable of imaging through obstructions, like clothing, and under low visibility conditions.

Since traditional SAR mmWave imaging suffers from poor resolution, specularity, and weak reflectivity from objects, the reconstructed shapes could often be imperceptible by humans. To this end, MilliGAN designs a machine-learning model to recover the high-spatial frequencies in the object to reconstruct an accurate 2D shape and predict its 3D features and category. Although we have customized MilliGAN for security applications, the model is adaptable to different applications, with limited training samples. We implement our combination system incorporating off-the-shelf components and demonstrate performance improvement over the traditional SAR, qualitatively and quantitatively.

More generally, presently disclosed subject matter relates more broadly to sensors.

In some exemplary embodiments disclosed herewith, systems and methods for hidden objects' shape generation, detection, and classification are described.

It is to be understood that the presently disclosed subject matter equally relates to associated and/or corresponding methodologies. One exemplary such method relates to a method for approximating SAR imaging on mobile mmWave devices to enable human-perceptible and machine-readable shape generation, and for classification of hidden objects on mobile mmWave devices, comprising obtaining shape data from a mobile device 3D mmWave for a target object; and using a machine-learning model to recover high-spatial frequencies in the object and reconstruct a 2D shape of the target object.

Another exemplary such method relates to a method for imaging and screening in handheld device settings, to achieve hidden shape perception by humans or classification by machines, to enable in situ security check without physical search of persons or baggage, comprising training a machine-learning model, based on inputs of examples of 3D mmWave shapes and based on the corresponding ground truth shapes, to learn the association between 3D mmWave shapes and the corresponding ground truth shapes; providing input to the trained machine-learning model, such input comprising 3D mmWave shape data from a mobile device; and operating the trained machine-learning model to process such input data to determine and output the corresponding ground truth 2D shape.

Other example aspects of the present disclosure are directed to systems, apparatus, tangible, non-transitory computer-readable media, user interfaces, memory devices, and electronic devices for ultrafast photovoltaic spectroscopy. To implement methodology and technology herewith, one or more processors may be provided, programmed to perform the steps and functions as called for by the presently disclosed subject matter, as will be understood by those of ordinary skill in the art.

Another exemplary embodiment of presently disclosed subject matter relates to a system that approximates, on mobile mmWave devices, SAR imaging of full-sized systems, to enable on mobile mmWave devices human-perceptible and machine-readable shape generation and classification of hidden objects, comprising a conditional generative adversarial network (cGAN)-based machine-learning system, trained based on inputs of examples of 3D mmWave shapes and on the corresponding ground truth shapes, to learn the association between 3D mmWave shapes and the corresponding 2D ground truth shapes; an input to the cGAN-based machine-learning system from a mobile device of 3D mmWave shape data of target objects; and a display for producing corresponding human perceptible 2D shapes output from the cGAN-based machine-learning system based on the input thereto.

Still another exemplary embodiment of presently disclosed subject matter relates to a cGAN-based machine-learning system, comprising one or more processors programmed to use a machine-learning model to recover the high-spatial frequencies in imperceptible 3D mmWave shape data for a target object, and to reconstruct and display an accurate human perceivable 2D shape for the target object.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, will appreciate that the presently disclosed subject matter applies equally to corresponding methodologies as associated with practice of any of the present exemplary devices, and vice versa.

These and other features, aspects and advantages of various embodiments will become better understood with reference to the following description and appended claims. The accompanying figures, which are incorporated in and constitute a part of this specification, illustrate embodiments of the present disclosure and, together with the description, serve to explain the related principles.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1A:
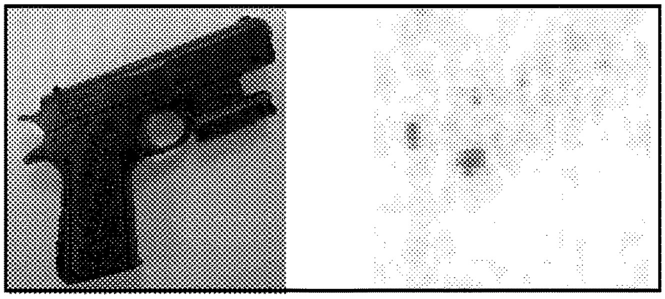
FIG. 1 illustrates some of the example shapes of hidden objects generated by a handheld mmWave system, and where the mmWave-generated shapes are imperceptible by humans.
Figure 1B:
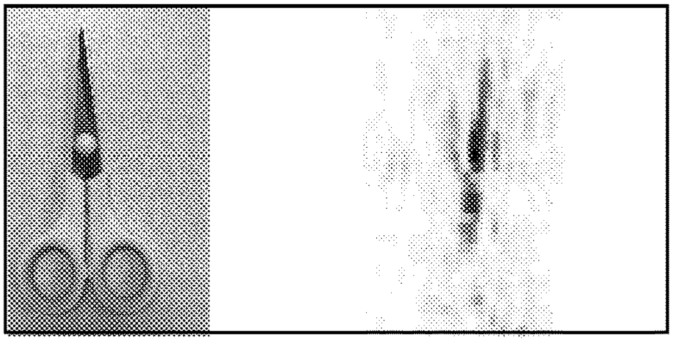
Figure 1C:
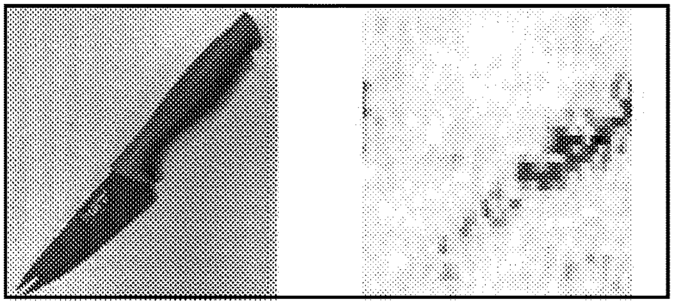
Figure 1D:
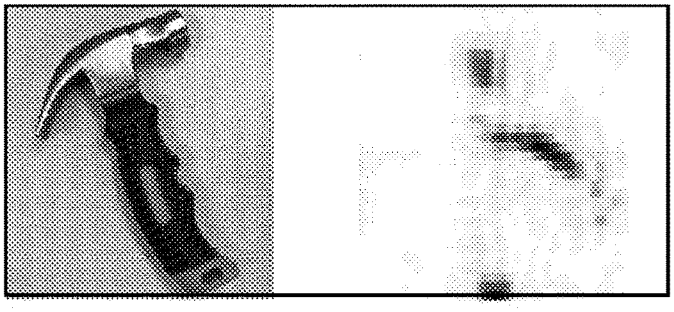
Figure 1E:
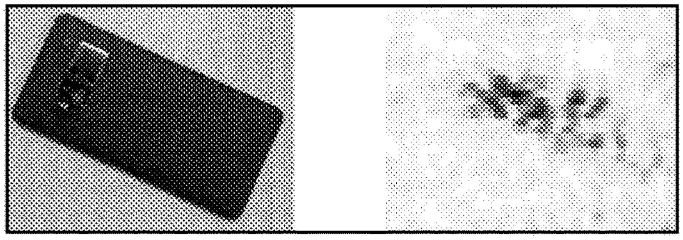

Repeat use of reference characters in the present specification and figures is intended to represent the same or analogous features, elements, or steps of the presently disclosed subject matter.

DETAILED DESCRIPTION OF THE PRESENTLY DISCLOSED SUBJECT MATTER

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment may be used in another embodiment to yield a still further embodiment. Thus, it is intended that the presently disclosed subject matter covers such modifications and variations as come within the scope of the appended claims and their equivalents.

In general, the present disclosure is directed to a system (and methodology) which is a design to improve the human perceptibility of the mmWave shapes. MilliGAN uses cGAN[23-25]. The high-level idea is intuitive: MilliGAN trains a cGAN framework by showing thousands of examples of mmWave shapes from traditional reconstruction and the corresponding ground truth shapes. cGAN framework uses a Generator (G) to learn the association between the 3D mmWave shape to the 2D ground truth shape and uses a Discriminator (D) that teaches G to learn better association at each iteration[23]. During the run time, when cGAN has been trained appropriately, G can estimate an accurate 2D depth map outlining the shape without the ground truth. In addition to the shape, we also use a Quantifier network (Q) that predicts the mean depth and orientation in the 3D plane, and a Classifier network (C) to automatically classify the objects into different categories.

Figure 2:
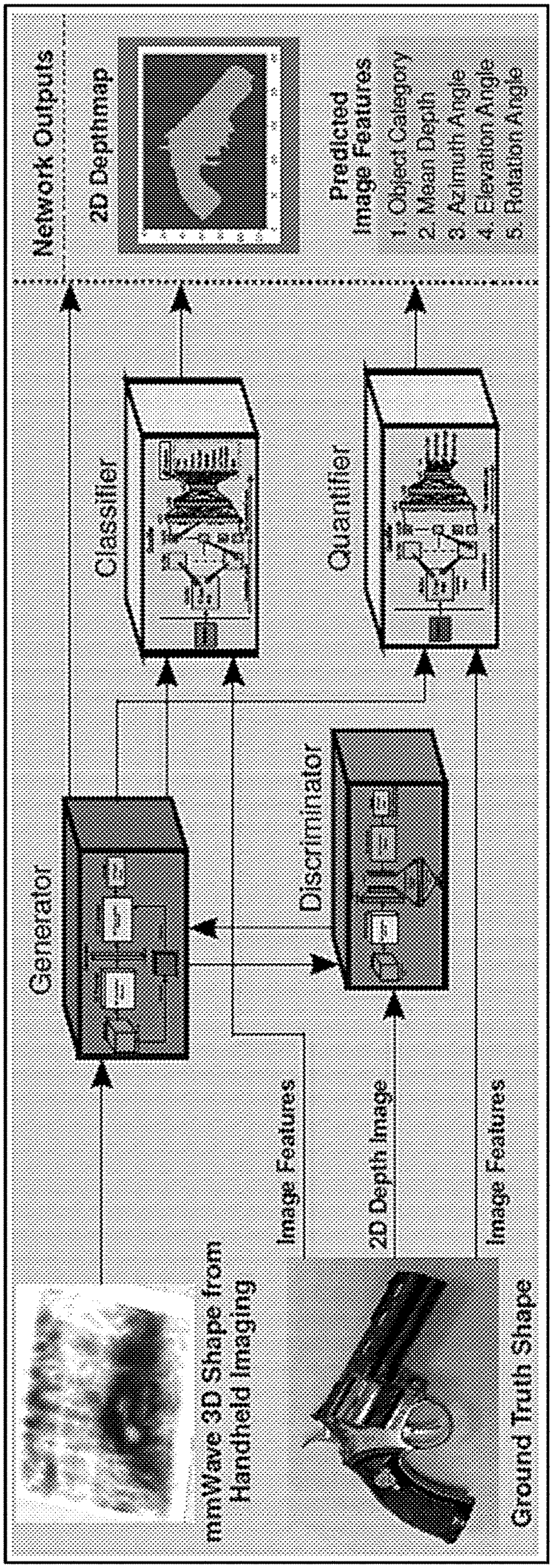
FIG. 2 illustrates an overview of the presently disclosed learning model (or learning system)

FIG. 2 illustrates an overview of the presently disclosed MilliGAN learning model (or learning system).

More particularly regarding the subject MilliGAN Learning System, FIG. 2 shows the machine-learning model in MilliGAN. The model consists of 4 network blocks: Generator (G), Discriminator (D), Quantifier (Q), and Classifier (C). G and D networks together constitute the cGAN architecture that generates the full object shape. Q network leverages the cGAN outputs and ground truth image features to learn and predict the mean depth and the orientation of the object in the 3D plane. Finally, C network leverages the cGAN outputs and supervised class labels to learn and classify the objects into different categories automatically.

Figure 3A:
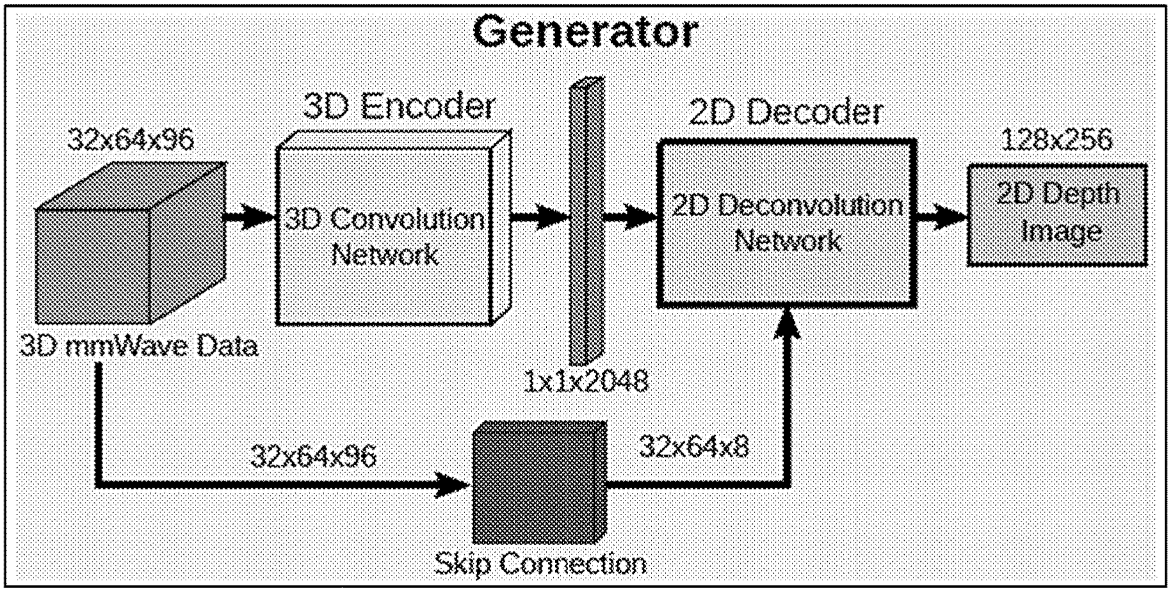
FIG. 3A illustrates an exemplary generator network block of the presently disclosed system.
Figure 3B:
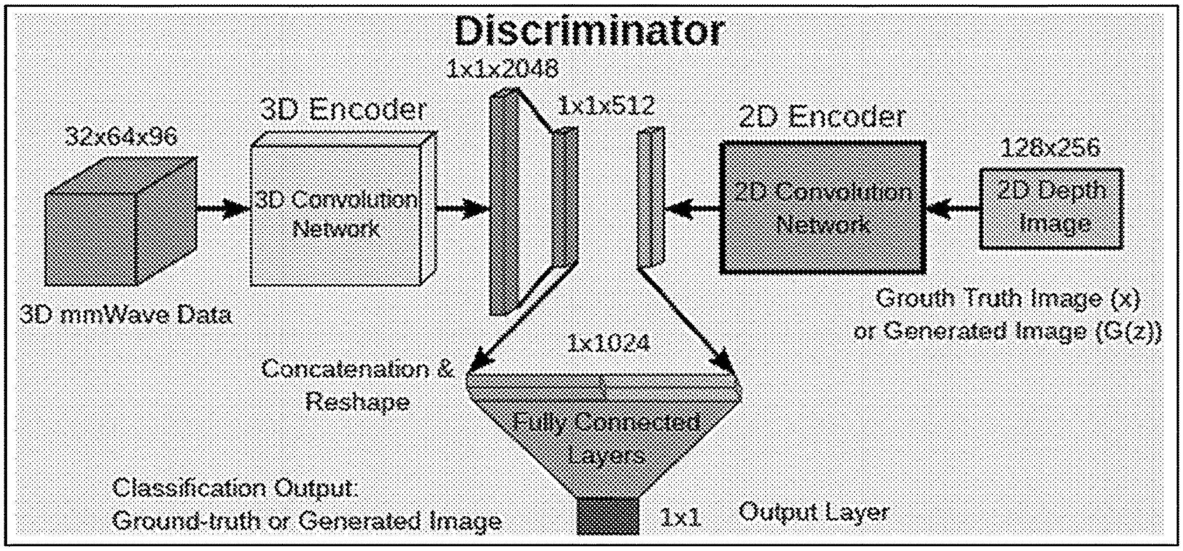
FIG. 3B illustrates an exemplary discriminator network block of the presently disclosed system.

FIG. 3A illustrates the G network of the MilliGAN system, while FIG. 3B illustrates the Discriminator network of the MilliGAN system.

The core purpose of the G is to be able to convert the imperceptible 3D mmWave shape to a human-perceivable 2D shape with all the edges, parts, and high-spatial frequencies. To this end, we utilize the traditional encoder-decoder architecture[26]. The encoder layer converts the 3D mmWave shape into a 1D feature vector using multiple 3D convolution layers and an end flatten layer. This 1D representation compresses the 3D shape so that the deeper layers could learn the high-level abstract features. By the end of 3D convolutions, we convert the spatial 3D data to 1×1×1, and at this point, the number of channels has been increased to hold these abstract features. The decoder layer leverages these 1D features and applies multiple deconvolution layers to decrease the number of channels and increase the spatial dimensions. Deconvolution stops when we reach the desired output size, and at that point, we have a single channel for a 2D shape. In our design, we follow prior literature[27] to use six 3D convolution layers and the eight 2D deconvolution layers at the encoder and the decoder, respectively, as represented in FIG. 3A.

Yet, passing the 3D mmWave shape through the encoder-decoder layers may yield a loss of detailed high-frequency information during encoding[28]. This is because the object could spread over the reconstructed volume, but only a few 2D slices contain the high-spatial frequencies; however, the encoder compresses them further while converting them into abstract 1D features. To preserve such high-frequency details, G employs a skip connection[27; 28] between input layer to the $6^{th}$ deconvolutional layer. The skip connection extracts the highest energy 2D slice from the 3D shape and concatenates it to the 2D deconvolution layer. However, due to different orientations of the object, various parts of it may not appear at a single highest energy slice; thus, a single 2D slice may not capture all the relevant high-frequency depth information and might cause instability in the network[27]. Therefore, G first finds the plane that intersects with the 3D voxel and likely has the highest energy from the object. Then, it selects a few neighboring 2D slices parallel to the highest-energy plane towards and away from the aperture plane. In practice, 4 neighboring slices from both sides of the highest energy plane perform well.

Finally, G leverages the feedback from the D to adjust the weights of its encoder-decoder layers to learn and predict the accurate 2D shapes. Table I summarizes the G network parameters.

TABLE I

Generator Network Parameters.

| | 3DC1 | 3DC2 | 3DC3 | 3DC4 | 3DC5 | 3DC6 | Output |
|---|---|---|---|---|---|---|---|
| Filter # | 16 | 32 | 64 | 128 | 256 | 1024 | |
| Filter Size | 6 × 6 × 6 | 6 × 6 × 6 | 6 × 6 × 6 | 6 × 6 × 6 | 6 × 6 × 6 | 6 × 6 × 6 | |
| Dilation | 2 × 2 × 2 | 2 × 2 × 2 | 2 × 2 × 2 | 2 × 2 × 2 | 2 × 2 × 2 | 2 × 2 × 2 | |
| Act. Fcn | LRelu | LRelu | LRelu | LRelu | LRelu | LRelu | Linear |

| | 2DDC1 | 2DDC2 | 2DDC3 | 2DDC4 | 2DDC5 | 2DDC6 | 2DDC7 | 2DDC8 | Output |
|---|---|---|---|---|---|---|---|---|---|
| Filter # | 1024 | 512 | 256 | 128 | 64 | 16 | 8 | 1 | |
| Filter Size | 4 × 3 | 4 × 4 | 4 × 4 | 4 × 4 | 4 × 4 | 4 × 4 | 4 × 4 | 4 × 4 | |

TABLE I-continued

| Generator Network Parameters. | | | | | | | | | |
|---|---|---|---|---|---|---|---|---|---|
| Dilation | 1 × 2 | 2 × 2 | 2 × 2 | 2 × 2 | 2 × 2 | 2 × 2 | 2 × 2 | 2 × 2 | |
| Act. Fcn | Relu | Relu | Relu | Relu | Relu | Relu | Relu | Relu | Linear |

3DC: 3D Convolution (with batch normalization);
2DDC: 2D Deconvolution (with batch normalization);
Act. Fcn: Activation Function;
LRelu: LeakyRelu;
Output layer uses linear activation.

The purpose of the D is to teach G a better association between the 3D mmWave shape and its 2D ground truth shape. D achieves this by distinguishing real and generated samples during the training process. It takes two inputs in the form of the 3D mmWave shape and the 2D shape that either is a real shape or is generated by G and produces output as a probability that the input is real, as illustrated by FIG. 3B. The goal of D is to increase the expected value from correctly discriminating between real and generated samples. To this end, D uses a similar architecture of the encoder layers in G to represent the 3D mmWave shape into a 1D feature vector. But instead of the decoder layers of G, D uses multiple 2D convolution layers that convert input 2D shapes to the same length 1D feature vector.

Finally, the two 1D feature vectors from both 3D and 2D convolutions are cascaded and fed into 2 fully connected dense layers that finally reach the single neuron output layer. The output layer is passed through a sigmoid activation function and outputs the probability that the given 2D shape is real. By G trying to minimize the expected value and D trying to maximize it, the entire cGAN will converge when D consistently outputs close to 0.5 probability of recognizing inputs correctly, i.e., real and generated shapes have an equal probability of being real. This ensures that G has learned enough to produce the correct 2D shapes. Table II summarizes the D network parameters.

Figure 4A:
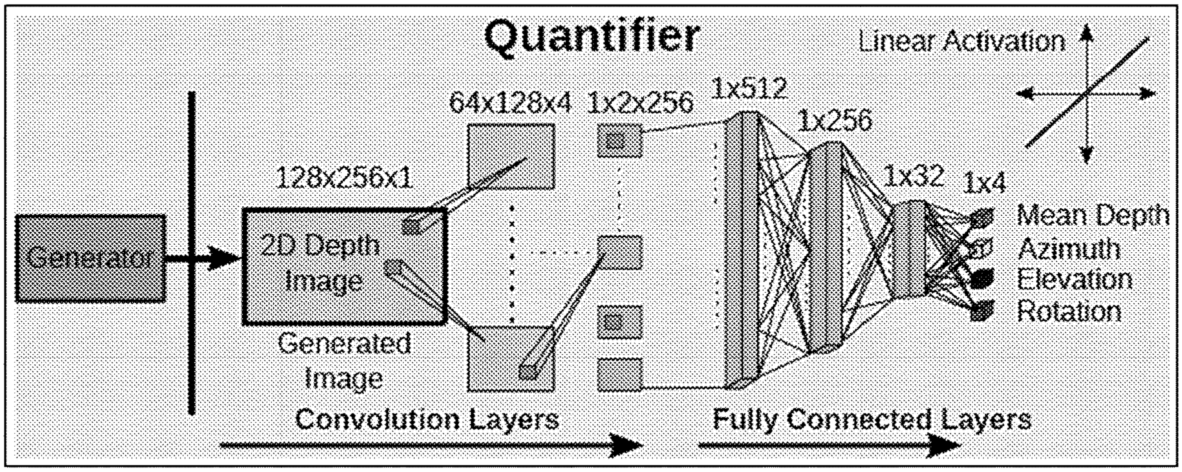
FIG. 4A illustrates an exemplary quantifier network block of the presently disclosed system.
Figure 4B:
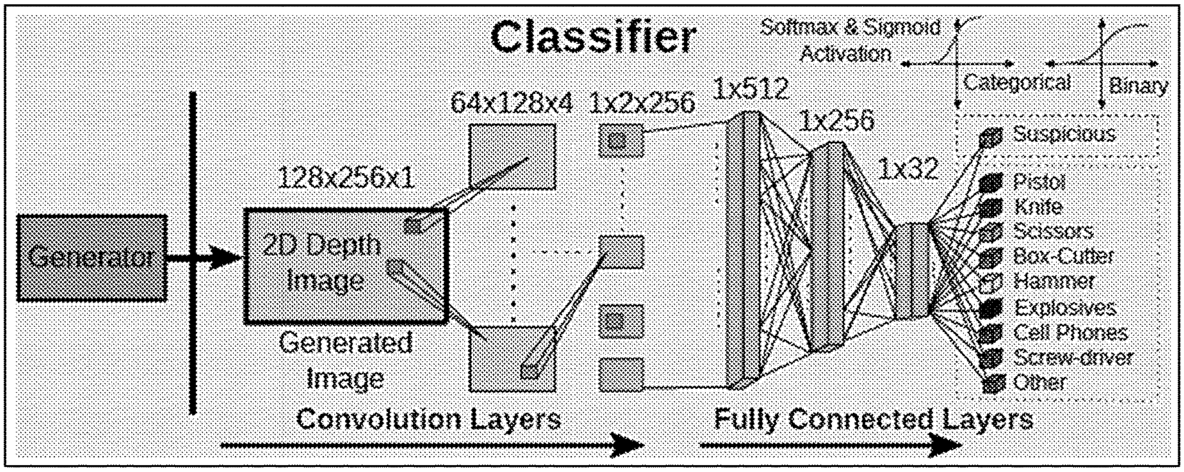
FIG. 4B illustrates an exemplary classifier network block of the presently disclosed system.

FIG. 4A illustrates the Q network of the MilliGAN system, while FIG. 4B illustrates the C network of the MilliGAN system.

Although our cGAN can recover most of the missing edges and parts of the objects, its output is only a 2D shape. Rather than predicting the entire 3D shape directly from the cGAN, which would be not only computationally expensive but also hard to learn due to inadequate input 3D data[29; 30], MilliGAN leverages a Q network that can estimate the 3D features of the object—Mean depth and its orientations in the 3D plane. FIG. 4A shows MilliGAN's Q network. Similar to D, Q leverages multiple 2D convolution layers to convert the 2D shape to a 1D feature vector. Q starts with the 2D shape as the input and applies seven 2D convolutional layers until it reaches the 1D fully connected layer with 512 neurons. The network then passes through 2 fully connected dense layers to reach the output layer with 4 output neurons corresponding to the four 3D features: Mean depth (d); Azimuth (φ); Elevation (θ); and Rotation (α). These output neurons have linear activation functions to predict actual value of these features. Table III summarizes the Q network parameters.

TABLE II

| Discriminator Network Parameters. | | | | | | | | | | | |
|---|---|---|---|---|---|---|---|---|---|---|---|
| | 3DC1 | 3DC2 | 3DC3 | 3DC4 | 3DC5 | 3DC6 | FC1 | Output | | | |
| Filter # | 16 | 32 | 64 | 128 | 256 | 1024 | | | | | |
| Filter Size | 6 × 6 × 6 | 6 × 6 × 6 | 6 × 6 × 6 | 6 × 6 × 6 | 6 × 6 × 6 | 6 × 6 × 6 | | | | | |
| Dilation | 2 × 2 × 2 | 2 × 2 × 2 | 2 × 2 × 2 | 2 × 2 × 2 | 2 × 2 × 2 | 2 × 2 × 2 | | | | | |
| Act. Fcn | LRelu | LRelu | LRelu | LRelu | LRelu | LRelu | Relu | Sigmoid | | | |
| | 2DC1 | 2DC2 | 2DC3 | 2DC4 | 2DC5 | 2DC6 | 2DC7 | FC2 | FC3 | FC4 | Output |
| Filter # | 4 | 8 | 16 | 32 | 64 | 128 | 256 | | | | |
| Filter Size | 4 × 3 | 6 × 6 × 6 | 6 × 6 × 6 | 6 × 6 × 6 | 6 × 6 × 6 | 6 × 6 × 6 | 6 × 6 × 6 | | | | |
| Dilation | 2 × 2 | 2 × 2 | 2 × 2 | 2 × 2 | 2 × 2 | 2 × 2 | 2 × 2 | | | | |
| Act. Fcn | LRelu | LRelu | LRelu | LRelu | LRelu | LRelu | LRelu | Relu | Relu | Relu | Sigmoid |

3DC: 3D Convolution (with batch norm.);
FC: Fully Connected;
2DC: 2D Convolution (with batch norm.);
Act. Fcn: Activation Function;
LRelu: LeakyRelu;
Output layer uses sigmoid activation.

TABLE III

Quantifier Network Parameters.

| | 2DC1 | 2DC2 | 2DC3 | 2DC4 | 2DC5 | 2DC6 | 2DC7 | FC1 | FC2 | FC3 | Output |
|---|---|---|---|---|---|---|---|---|---|---|---|
| Filter # | 4 | 8 | 16 | 32 | 64 | 128 | 256 | | | | |
| Filter Size | 4 × 3 | 6 × 6 × 6 | 6 × 6 × 6 | 6 × 6 × 6 | 6 × 6 × 6 | 6 × 6 × 6 | 6 × 6 × 6 | | | | |
| Dilation | 2 × 2 | 2 × 2 | 2 × 2 | 2 × 2 | 2 × 2 | 2 × 2 | 2 × 2 | | | | |
| Act. Fcn | LRelu | LRelu | LRelu | LRelu | LRelu | LRelu | LRelu | Relu | Relu | Relu | Linear |

2DC: 2D Convolution (with batch normalization);
FC: Fully Connected;
Act. Fcn: Activation Function;
LRelu: LeakyRelu;
Output layer uses linear activation.

So far, MilliGAN recovers the full 2D shape and 3D features of an object from its 3D mmWave shape. We now extend MilliGAN's capability to detect and classify various real-life objects automatically. This is useful in non-intrusive applications like automated packaged inventory counting, remote pat-down searching, etc. To this end, we propose a C network customized for a handheld security application that leverages the predicted 2D shape to label it to one of the object classes automatically. Similar to D and Q, C leverages seven 2D convolution layers and two fully connected dense layers to predict the classes.

In our implementation, we select the sample of items used by most security screening procedures (e.g., pistols, knives, scissors, hammers, boxcutters, cell phones, explosives, screwdrivers[3]) as the categorical outputs. In addition to these categories, we add one extra "Other" category to include various other items, such as books, keyring, wallet, keychain, etc. Hence, the categorical output has nine neurons in the output layer. Although C is currently not trained on all possible items of interest exhaustively, we note that our network is scalable to more objects without requiring substantial changes in the layers or training with large samples. In addition to fine-grained classification, we also incorporate a binary classification of objects being suspicious or not. Such binary output could be very useful for hidden object annotations so security personnel could perform additional checks. Dangerous objects which should not be missed during classification are labeled as suspicious, e.g., knives, pistols, explosives, etc. Finally, C uses the softmax and sigmoid activation functions for the categorical and binary output layers, respectively. Table IV summarizes the C network parameters.

lute error, while traditional GAN loss maintains the adversarial game. Our combined cGAN loss is determined by:

$$L_{cGAN}=L(G)+\lambda_L \cdot L_1(G), \text{ where } L_1(G)=E\|x_L-G(z_L)\|_1 \quad (1)$$

Q network leverages the cGAN loss $L_{cGAN}$ and 3D features' loss between the ground truth and the prediction to determine its loss function:

$$L_Q=L_{cGAN}+\lambda_F \cdot L_F(G), \text{ where } L_F(G)=E\|x_F-G(z_F)\|_1 \quad (2)$$

Finally, C network leverages $L_{cGAN}$, categorical loss $L_C$, and binary loss $L_B$. The categorical and binary losses are computed as the cross-entropy losses between actual probabilities and predicted probabilities of different categories and binary classes[33], and are calculated as:

$$L_{class}(G) = L_{cGAN} + \lambda_C \cdot L_C(G) + \lambda_B \cdot L_B(G), \text{ where} \quad (3)$$

$$L_C(G) = -\sum_{i=1}^{9} t_i \log(c(s_i)) \text{ and } L_B(G) = -(t_0\log(p_0) + (1-t_0)\log(1-p_0)) \quad (4)$$

where $c(s_i)$ and $t_i$ are the predicted and actual probabilities of $i^{th}$ class (categorical output), $p_0$ and $t_0$ are the predicted and actual probabilities of suspicious object (binary output), and the hyper-parameters ($\lambda_L$, $\lambda_F$, $\lambda_C$, $\lambda_B$) represent the networks' focus on shape reconstruction, features prediction, and classification.

Our goal is to find the set of values for these parameters which would minimize the individual losses. However, determining the exact values is tricky and difficult, although intuitively, the value for $\lambda_L$ should be the largest since it is responsible for accurate reconstruction of human perceiv-

TABLE IV

Classifier Network Parameters.

| | 2DC1 | 2DC2 | 2DC3 | 2DC4 | 2DC5 | 2DC6 | 2DC7 | FC1 | FC2 | FC3 | Category Output | Binary Output |
|---|---|---|---|---|---|---|---|---|---|---|---|---|
| Filter # | 4 | 8 | 16 | 32 | 64 | 128 | 256 | | | | | |
| Filter Size | 4 × 3 | 6 × 6 × 6 | 6 × 6 × 6 | 6 × 6 × 6 | 6 × 6 × 6 | 6 × 6 × 6 | 6 × 6 × 6 | | | | | |
| Dilation | 2 × 2 | 2 × 2 | 2 × 2 | 2 × 2 | 2 × 2 | 2 × 2 | 2 × 2 | | | | | |
| Act. Fcn | LRelu | LRelu | LRelu | LRelu | LRelu | LRelu | LRelu | Relu | Relu | Relu | Softmax | Sigmoid |

2DC: 2D Convolution (with batch normalization);
FC: Fully Connected;
Categorical class output layer uses softmax, and Binary output layer uses sigmoid activation functions.

Regarding network loss functions, all the network blocks rely on their loss functions to appropriately tune the weights and train themselves. We use the $L_1$-norm loss $L_1(G)$[31] as well as traditional GAN loss $L(G)$[32] to train the cGAN consisting of G and D. $L_1$ loss helps the networks to predict the 2D shape better by estimating pixel-to-pixel mean absoable 2D shapes. These networks with their optimized loss functions enable MilliGAN to fill up the missing edges and parts in 2D shapes, predict the 3D features, and classify the objects accurately.

Results include shape improvement from cGAN and 3D features prediction, as discussed hereafter.

Figure 5A:
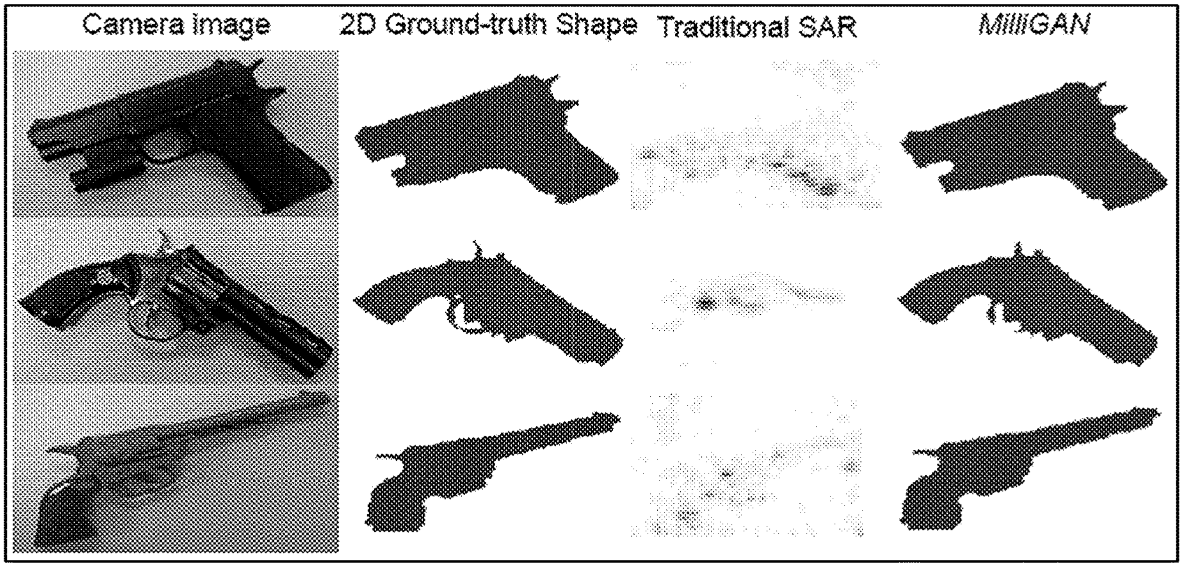
FIG. 5A illustrates shapes reconstructed by presently disclosed subject matter from three test samples.
Figure 5B:
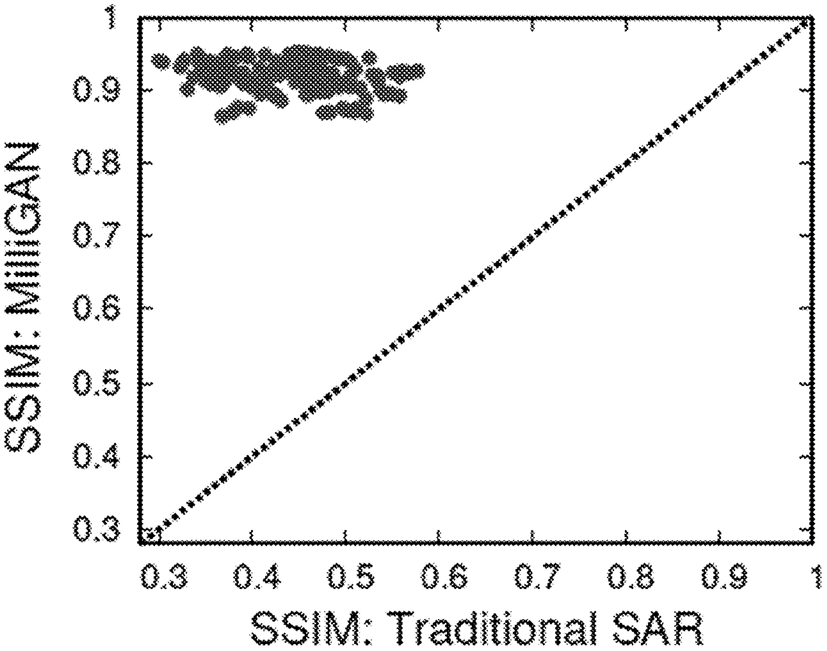
FIG. 5B illustrates Structural Similarity Index Measure (SSIM) comparisons across 150 test samples.

With reference to shape improvement from cGAN, we evaluate MilliGAN's cGAN architecture in enhancing the shapes. FIG. 5A illustrates shapes reconstructed by MilliGAN from three test samples. FIG. 5B illustrates SSIM comparison across 150 test samples. Thus, FIGS. 5A and B show both qualitative and quantitative results.

First, FIG. 5A shows the reconstruction of the shapes of three test samples in cGAN and contrasts the result with traditional SAR with perfect 2D grid-based measurements. Even if MilliGAN is never trained on these samples, it can accurately reconstruct the shapes with all the parts and edges and key discriminating features, such as barrel, butt, and trigger.

Figure 8:
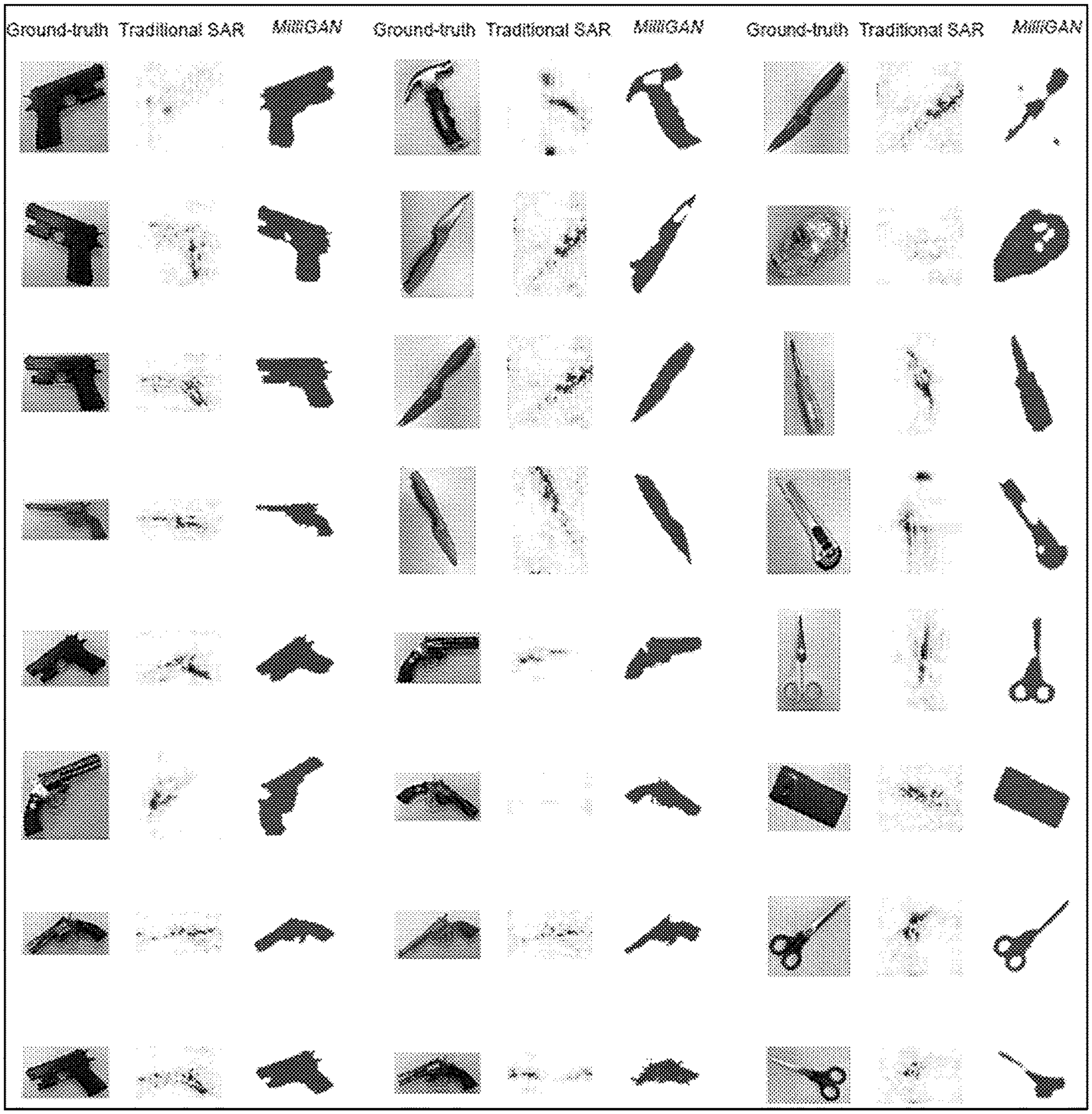
FIG. 8 illustrates a number of further shape reconstructions from use of presently disclosed subject matter.

Second, to evaluate the generalizability of MilliGAN, we run cGAN over 150 test samples and calculate the SSIM[34] by considering the 2D ground truth shapes as the reference. FIG. 5B shows the SSIM results with a scatter plot. Each point on the plot represents a test sample: X-value is the traditional SAR's SSIM (like column 3 in FIG. 5A) and Y-value is the MilliGAN's SSIM. While traditional SAR could only achieve an average SSIM of 0.44, MilliGAN's has an average SSIM of more than 0.9 across 150 test samples. FIG. 8 shows additional shape reconstruction results.

Regarding prediction of 3D features, recall that Q leverages the generated 2D shape to predict the object's 3D features (mean depth and 3D orientation). We use the previous 150 test samples and estimate the error in predicting the features. We also compare the results with a baseline network that uses the shapes reconstructed by the traditional SAR only. To create the baseline, we use Q's architecture but train the layers with traditional SAR generated shapes. This baseline network is also trained with identical sets of synthesized and real samples for the same number of epochs that were used in MilliGAN training.

Figure 6A:
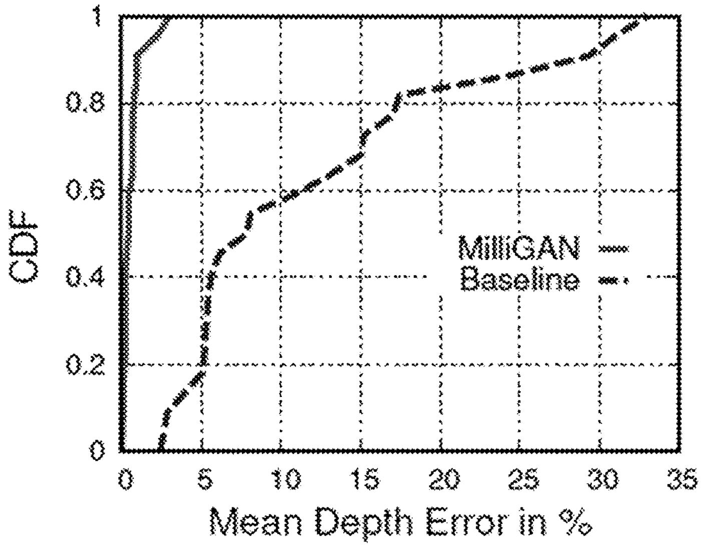
FIG. 6A illustrates percentage error in mean depth prediction in real samples.
Figure 6B:
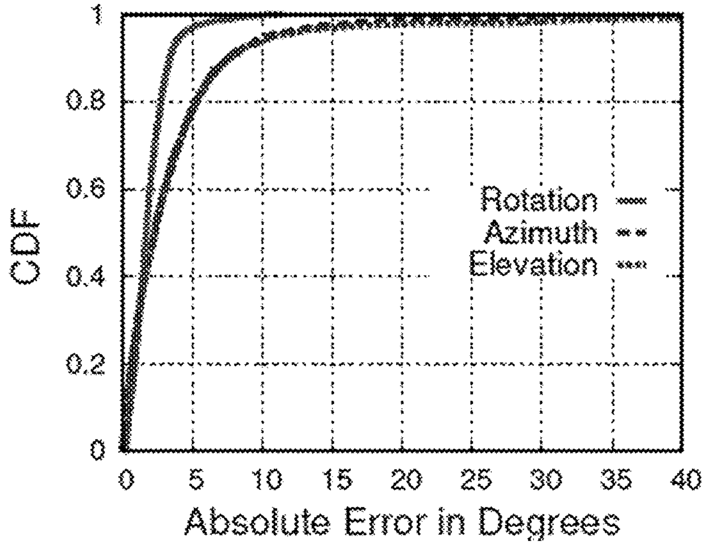
FIG. 6B illustrates absolute error in orientation prediction in synthetic samples.
Figure 6C:
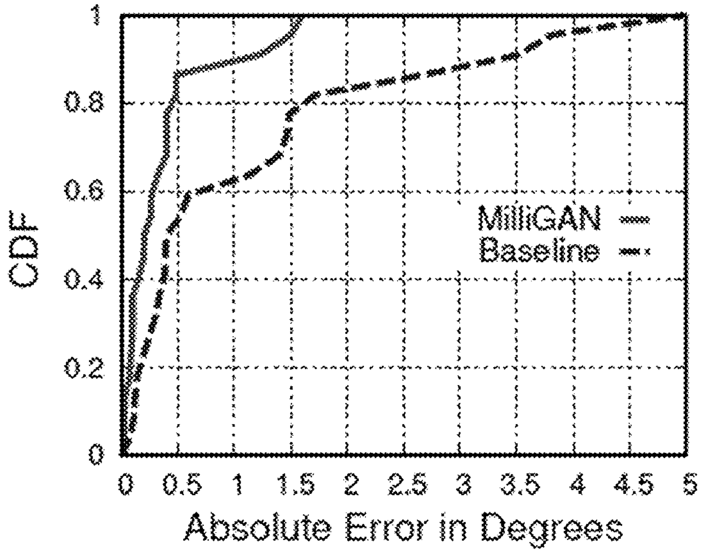
FIG. 6C illustrates absolute error in rotation angle prediction in real samples.

FIG. 6A illustrates the percentage error in mean depth prediction in real samples, while FIG. 6B illustrates the absolute error in orientation prediction in synthetic samples, and FIG. 6C illustrates the absolute error in rotation angle prediction in real samples.

More particularly, FIG. 6A shows the CDF of depth error for MilliGAN and baseline. We observe that under the baseline, the median depth error is about 8% and $90^{th}$ percentile could reach up to 29.35%. In contrast, under MilliGAN, the median depth error is about 0.43% and $90^{th}$ percentile is less than 1%. Such high depth estimation accuracy is attributed to the cGAN-reconstructed accurate 2D shapes, where pixel values already embed the depth information and aid Q to learn it better. FIGS. 6B and 6C further evaluate Q in terms of 3D orientation prediction. Due to a constraint in mounting objects with different azimuth and elevation angles, we first evaluate the 3D orientation prediction with synthetic samples. Then, we evaluate the rotation angle prediction with real samples. FIG. 6B shows that in 90% of samples, both the predicted azimuth and elevation angles have less than a 7.6° error. The rotation angle prediction shows the least error, less than 3.4° in $90^{th}$ percentile. We also verified the rotation angle prediction with real samples; FIG. 6C shows that $90^{th}$ percentile error is less than 1.22°. Both the shape improvement and 3D features prediction results indicate that MilliGAN generalizes its model well in real scenes with various object shapes and sizes, even if the model is trained mainly on synthesized data and only on limited real samples.

Recall that C can predict nine object categories along with their binary classes. We randomly select 540 test samples (60 from each of the categories) and use the cGAN to produce the accurate 2D shapes. Then, we input these 2D shapes to C to predict their class labels. Since C is customized towards security application, we use 0.98 as the class probability threshold so any object with less than 98% confidence is placed under the "Other" class. We also use the same set of samples for binary classification of labeling the objects as suspicious or not.

Table V shows the confusion matrix of categorical labeling with rows as the predicted probability.

TABLE V

Confusion matrix of categorical classifier in MilliGAN.

| Actual/ Predicted | Boxcutter | Cell Phone | Explosive | Hammer | Knife | Pistol | Scissor | Screw | Other |
|---|---|---|---|---|---|---|---|---|---|
| Boxcutter | 90 | 0 | 0 | 0 | 0 | 0 | 0 | 0 | 10 |
| Cell Phone | 0 | 100 | 0 | 0 | 0 | 0 | 0 | 0 | 0 |
| Explosive | 0 | 0 | 100 | 0 | 0 | 0 | 0 | 0 | 0 |
| Hammer | 0 | 0 | 0 | 100 | 0 | 0 | 0 | 0 | 0 |
| Knife | 0 | 0 | 0 | 0 | 92 | 0 | 0 | 0 | 8 |
| Pistol | 0 | 0 | 0 | 0 | 0 | 100 | 0 | 0 | 0 |
| Scissor | 0 | 0 | 0 | 0 | 0 | 0 | 100 | 0 | 0 |
| Screw | 0 | 0 | 0 | 0 | 0 | 0 | 0 | 70 | 30 |
| Other | 0 | 13 | 25 | 0 | 0 | 5 | 0 | 0 | 57 |

Cell phones, explosives, hammers, pistols, and scissors all show 100% accuracy in Table V because these objects reflect mmWave signals strongly and cGAN can accurately reconstruct their shapes, aiding C to do a perfect classification. We also observe that 13% and 25% of "Other" categories are classified as cell phones and explosives because of their shape similarity (e.g., wallet and keychains, etc.). Overall, C has an average prediction accuracy of ~90%. Instead of 98% confidence, using the highest output probability to predict the labels, we still find that the average prediction accuracy is ~88%, indicating that our model does not fit data to any one of the particular categories excessively.

We also observe in Table VI that the binary classification is more accurate, which is expected since there are only two class labels. Still, we get 6% false positives (non-suspicious items classified as suspicious) mostly due to the wrong classifications of "Other" categories. However, the false negatives in our test samples are low (1.75%), which makes MilliGAN promising for security applications.

TABLE VI

Binary class confusion matrix.

| Actual/Predicted | Suspicious | Non-Suspicious |
|---|---|---|
| Suspicious | 98.25 | 1.75 |
| Non-Suspicious | 6 | 94 |

Figure 7A:
FIG. 7A illustrates shape reconstruction results in accordance with presently disclosed subject matter for a partially occluded gun.
Figure 7B:
FIG. 7B illustrates shape reconstruction results in accordance with presently disclosed subject matter for a fully occluded gun.
Figure 7C:
FIG. 7C illustrates shape reconstruction results in accordance with presently disclosed subject matter for a fully occluded pair of scissors.

Finally, FIGS. 7A-7C show three examples of visual results when the items are mounted on a human dummy. In particular, they illustrate shape reconstruction results for a partially occluded gun (FIG. 7A), a fully occluded gun (FIG. 7B), and a fully occluded pair of scissors (FIG. 7C).

While the traditional SAR fails to generate any interpretable results, either in partially or fully occluded scenes, MilliGAN can clearly show sharp images with discriminating features, even if it has never learned the scene before. These results demonstrate that MilliGAN is well generalizable under real conditions with different background noise and movements in the environment.

FIG. 8 illustrates a number of further shape reconstructions from MilliGAN.

While certain embodiments of the disclosed subject matter have been described using specific terms, such description is for illustrative purposes only, and it is to be understood that changes and variations may be made without departing from the spirit or scope of the subject matter. In particular, this written description uses examples to disclose the presently disclosed subject matter, including the best mode, and also to enable any person skilled in the art to practice the presently disclosed subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural and/or step elements that do not differ from the literal language of the claims, or if they include equivalent structural and/or elements or steps with insubstantial differences from the literal language of the claims.

REFERENCES

[1] "ProVision Automatic Target Detection," 2015. [Online]. Available: sds.Icom.com/advancedimaging/provisionat.com

[2] Transportation Security Administration Press Office, "TSA Takes Next Steps to Further Enhance Passenger Privacy," July, 2011. [Online]. Available: tsa.gov/news/releases/2011/07/20/tsa-takes-next-steps-further-enhance-passenger-privacy

[3] Transportation Security Administration, "What Can I Bring?" 2017. [Online]. Available: tsa.gov/travel/security-screening/whatcanibring

[4] F. Adib, Z. Kabelac, D. Katabi, and R. C. Miller, "3D Tracking via Body Radio Reflections," in *Proc. of USENIX NSDI,* 2014.

[5] S. Nannuru, Y. Li, Y. Zeng, M. Coates, and B. Yang, "Radio-Frequency Tomography for Passive Indoor Multitarget Tracking," in *IEEE Transactions on Mobile Computing,* 2013.

[6] J. Xiong and K. Jamieson, "ArrayTrack: A Fine-Grained Indoor Location System," in *USENIX NSDI,* 2013.

[7] Thales Visionix Inc., "IS-900," 2014. [Online]. Available: intersense.com/pages/20/14

[8] Redecomposition, "See Through Wall Radar Imaging Technology," 2015. [Online]. Available: redecomposition.wordpress.com/technology/

[9] F. Adib and D. Katabi, "See Through Walls with WiFi!" in *Proc. of ACM SIGCOMM,* 2013.

[10] F. Adib, C.-Y. Hsu, H. Mao, D. Katabi, and F. Durand, "Capturing the Human FIG. Through a Wall," in *Proc. of ACM SIGGRAPH Asia*. Los Angeles, California, USA: Association for Computing Machinery, 2015.

[11] Yonglong Tian and Guang-He Lee and Hao He and Chen-Yu Hsu and Dina Katabi, "RF-Based Fall Monitoring Using Convolutional Neural Networks," in *Proc. of ACM on Interactive, Mobile, Wearable and Ubiquitous Technologies* (*IMWUT*), 2018.

[12] Chen-Yu Hsu and Yuchen Liu and Zachary Kabelac and Rumen Hristov and Dina Katabi and Christine Liu, "Extracting Gait Velocity and Stride Length from Surrounding Radio Signals," in *ACM CHI,* 2017.

[13] Kajbaf, Hamed and Zheng, Rosa and Zoughi, Reza, "Improving Efficiency of Microwave Wideband Imaging using Compressed Sensing Techniques," *Materials Evaluation*, vol. 70, pp. 1420-1432, 12 2012.

[14] D. M. Sheen, D. L. McMakin, and T. E. Hall, "Three-Dimensional MmWave Imaging for Concealed Weapon Detection," *IEEE Transactions on Microwave Theory and Techniques*, vol. 49, no. 9, 2001.

[15] M. E. Yanik and M. Torlak, "Near-Field MIMO-SAR MmWave Imaging With Sparsely Sampled Aperture Data," *IEEE Access*, vol. 7, pp. 31 801-31 819, 2019.

[16] M. Soumekh, *Synthetic Aperture Radar Signal Processing*. John Wiley & Sons, Inc., 1999.

[17] M. Soumekh, "A System Model and Inversion for Synthetic Aperture Radar Imaging," *IEEE Transactions on Image Processing*, vol. 1, no. 1, 1992.

[18] B. Mamandipoor, G. Malysa, A. Arbabian, U. Madhow, and K. Noujeim, "60 GHz Synthetic Aperture Radar for Short-Range Imaging: Theory and Experiments," in *IEEE Asilomar Conference on Signals, Systems and Computers,* 2014.

[19] Y. Zhu, Y. Zhu, B. Y. Zhao, and H. Zheng, "Reusing 60 GHz Radios for Mobile Radar Imaging," in *ACM MobiCom,* 2015.

[20] Jeffrey Nanzer, *Microwave and MmWave Remote Sensing for Security Applications*. Artech House, 2013.

[21] Hao Xu and Vikas Kukshya and Theodore S. Rappaport, "Spatial and Temporal Characteristics of 60-GHz Indoor Channels," *IEEE Journal on Selected Areas in Communications*, vol. 20, no. 3, 2002.

[22] Peter F. M. Smulders, "Statistical Characterization of 60-GHz Indoor Radio Channels," *IEEE Transactions on Antennas and Propagation*, vol. 57, no. 10, 2009.

[23] Mehdi Mirza, Simon Osindero, "Conditional Generative Adversarial Nets," 2014. [Online]. Available: arxiv.org/abs/1411.1784

[24] C. Ledig and L. Theis and F. Huszar and J. Caballero and A. Cunningham and A. Acosta and A. Aitken and A. Tejani and J. Totz and Z. Wang and W. Shi, "Photo-Realistic Single Image Super-Resolution Using a Generative Adversarial Network," in 2017 *IEEE Conference on Computer Vision and Pattern Recognition* (*CVPR*), 2017.

[25] Phillip Isola and Jun-Yan Zhu and Tinghui Zhou and Alexei A. Efros, "Image-to-Image Translation with Conditional Adversarial Networks," in *IEEE Conference on Computer Vision and Pattern Recognition* (*CVPR*). IEEE, 2017.

[26] V. Badrinarayanan, A. Kendall, and R. Cipolla, "SegNet: A Deep Convolutional Encoder-Decoder Architecture for Image Segmentation," *IEEE Transactions on Pattern Analysis and Machine Intelligence*, vol. 39, no. 12, 2017.

[27] J. Guan, S. Madani, S. Jog, S. Gupta, and H. Hassanieh, "Through Fog High-Resolution Imaging Using Millimeter Wave Radar," in *IEEE/CVF Conference on Computer Vision and Pattern Recognition* (*CVPR*), 2020.

[28] H. Ahn and C. Yim, "Convolutional Neural Networks Using Skip Connections with Layer Groups for Super-Resolution Image Reconstruction Based on Deep Learning," *Applied Sciences*, vol. 10, p. 1959, 03 2020.

[29] C.-L. Li, M. Zaheer, Y. Zhang, B. Poczos, and R. Salakhutdinov, "Point Cloud GAN," 2018. [Online]. Available: arxiv.org/abs/1810.05795

[30] Edward Smith and David Meger, "Improved Adversarial Systems for 3D Object Generation and Reconstruction," 2017. [Online]. Available: arxiv.org/abs/1707.09557

[31] H. Zhao, O. Gallo, I. Frosio, and J. Kautz, "Loss Functions for Image Restoration With Neural Networks," *IEEE Transactions on Computational Imaging*, vol. 3, no. 1, pp. 47-57, 2017.

[32] Goodfellow, Ian J. and Pouget-Abadie, Jean and Mirza, Mehdi and Xu, Bing and Warde-Farley, David and Ozair, Sherjil and Courville, Aaron and Bengio, Yoshua, "Generative Adversarial Networks," in *27th International Conference on Neural Information Processing Systems*. Montreal, Canada: ACM, 2014, pp. 2672-2680.

[33] Raul Gomez Blog, "Understanding Categorical Cross-Entropy Loss, Binary Cross-Entropy Loss," 2021. [Online]. Available: gombru.github.io/2018/05/23/cross entropy loss/

[34] Zhou Wang, A. C. Bovik, H. R. Sheikh, and E. P. Simoncelli, "Image Quality Assessment: From Error Visibility to Structural Similarity," *IEEE Transactions on Image Processing*, vol. 13, no. 4, 2004.

What is claimed is:

1. A method for approximating Synthetic Aperture Radar (SAR) imaging on mobile mmWave (mmWave) devices, to enable human-perceptible and machine-readable shape generation and classification of hidden objects on mobile mmWave devices, comprising:

obtaining from a mobile device 3D mmWave shape data for a target object; and using a machine-learning model to recover high-spatial frequencies in the object and reconstruct a 2D shape of the target object, wherein recovering the high-spatial frequencies comprises finding a plane that intersects with a 3D voxel of the 3D mmWave shape data having a highest energy, selecting a plurality of neighboring 2D slices parallel to the highest-energy plane towards and away from an aperture plane, and concatenating the selected 2D slices to a 2D deconvolution layer of the machine-learning model.

2. The method according to claim 1, further comprising displaying the reconstructed 2D target object shape.

3. The method according to claim 1, further comprising predicting 3D features and category of the target object.

4. The method according to claim 1, wherein the target object comprises one of a set of target objects to screen and remove for security applications without requiring physical searches.

5. The method according to claim 1, wherein the mobile device is handheld.

6. The method according to claim 1, wherein the machine-learning model comprises a conditional Generative Adversarial Network (cGAN) trained, based on inputs of examples of mmWave shapes from traditional reconstruction and based on the corresponding ground truth shapes, to learn the association between the 3D mmWave shape data and the 2D ground truth shape.

7. The method according to claim 6, further comprising generating a full 2D image of the target object based on the 3D mmWave shape data for a target object.

8. The method according to claim 1, further comprising predicting the shape of the target object, and the mean depth and orientation of the shape in a 3D plane.

9. The method according to claim 8, further comprising automatically classifying the objects into different categories.

10. The method according to claim 1, further comprising providing one or more processors programmed to provide a machine-learning model to perform the method.

11. A method for imaging and screening in handheld device settings, to achieve hidden shape perception by humans or classification by machines, to enable in situ security check without physical search of persons or baggage, comprising:

training a machine-learning model, based on inputs of examples of 3D mmWave shapes and based on the corresponding ground truth shapes, to learn the association between 3D mmWave shapes and the corresponding ground truth shapes;

providing input to the trained machine-learning model, such input comprising 3D mmWave shape data from a mobile device; and operating the trained machine-learning model to process such input data to determine and output the corresponding ground truth 2D shape, wherein processing such input data comprises finding a plane that intersects with a 3D voxel of the 3D mmWave shape data having a highest energy, selecting a plurality of neighboring 2D slices parallel to the highest-energy plane towards and away from an aperture plane, and concatenating the selected 2D slices to a 2D deconvolution layer of the machine-learning model.

12. The method according to claim 11, further comprising:

displaying the determined corresponding ground truth 2D shape; and predicting 3D features and classification category of the determined corresponding ground truth 2D shape.

13. The method according to claim 12, wherein the classification category includes at least one of guns, knives, scissors, hammers, boxcutters, cell phones, explosives, screwdrivers, and other.

14. The method according to claim 13, further comprising indicating that the predicted classification category falls into a binary classification of whether the shape is suspicious or not.

15. The method according to claim 11, wherein the machine-learning model comprises a conditional Generative Adversarial Network (cGAN)-based trained system.

16. The method according to claim 12, further comprising determining the mean depth, the azimuth angle, the elevation angle, and the rotation angle of the corresponding ground truth 2D shape in a 3D plane.

17. The method according to claim 15, further comprising providing one or more programmed processors for implementing the conditional Generative Adversarial Network (cGAN)-based trained system.

18. The method according to claim 17, wherein the one or more processors are further programmed to provide respective generator and discriminator network blocks of the machine-learning model, which collectively generate a full 2D image of the shape based on the 3D mmWave shape data.

19. The method according to claim 18, wherein the one or more processors are further programmed to implement within the generator network block an encoder-decoder architecture.

20. The method according to claim 19, wherein the one or more processors are further programmed:

to provide respective quantifier and classifier network blocks of the cGAN-based machine-learning system; and to enable the generator network block to use feedback from the discriminator network block to adjust weights of the generator network block encoder-decoder architecture encoder-decoder layers to learn and predict accurate 2D shapes.

21. The method according to claim 20, wherein the one or more processors are further programmed for the generator and discriminator network blocks to use the $L_1$-norm loss $L_1(G)$ and traditional GAN loss $L(G)$ to train the cGAN-based system comprising the generator and discriminator network blocks, with combined cGAN-based system loss determined by:

$$L_{cGAN}=L(G)+\lambda_L \cdot L_1(G), \text{ where } L_1(G)=E\|x_L-G(z_L)\|_1.$$

22. The method according to claim 20, wherein the one or more processors are further programmed for the quantifier network block to determine its loss function:

$$L_Q=L_{cGAN}+\lambda_F \cdot L_F(G), \text{ where } L_F(G)=E\|x_F-G(z_F)\|_1.$$

23. The method according to claim 20, wherein the one or more processors are further programmed for the classifier network block to determine its loss function calculated as:

$$L_{class}(G) = L_{cGAN} + \lambda_C \cdot L_C(G) + \lambda_B \cdot L_B(G), \text{ where}$$

$$L_C(G) = -\sum_{i=1}^{9} t_i \log(c(s_i)) \text{ and } L_B(G) = -(t_0 \log(p_0) + (1-t_0)\log(1-p_0))$$

where $c(s_i)$ and $t_i$ are the predicted and actual probabilities of $i^{th}$ class (categorical output), $p_0$ and $t_0$ are the predicted and actual probabilities of suspicious object (binary output), and the hyper-parameters ($\lambda_L$, $\lambda_F$, $\lambda_C$, $\lambda_B$) represent the networks' focus on shape reconstruction, features prediction, and classification.

24. A system that approximates, on mobile mmWave devices, SAR imaging of full-sized systems, to enable human-perceptible and machine-readable shape generation and classification of hidden objects on mobile mmWave devices, comprising:

a conditional generative adversarial network (cGAN)-based machine-learning system, trained based on inputs of examples of 3D mmWave shapes and based on the corresponding ground truth shapes, to learn the association between 3D mmWave shapes and the corresponding 2D ground truth shapes;

an input to the cGAN-based machine-learning system from a mobile device of 3D mmWave shape data of target objects; and a display for producing corresponding human perceptible 2D shapes output from the cGAN-based machine-learning system based on the input thereto, wherein the cGAN-based machine-learning system is configured to process the 3D mmWave shape data by finding a plane that intersects with a 3D voxel of the 3D mmWave shape data having a highest energy, selecting a plurality of neighboring 2D slices parallel to the highest-energy plane towards and away from an aperture plane, and concatenating the selected 2D slices to a 2D deconvolution layer of the cGAN-based machine-learning system.

25. The system according to claim 24, wherein the cGAN-based machine-learning system further includes respective generator and discriminator network blocks, which collectively generate a full 2D image of the target object based on the 3D mmWave shape data for a target object.

26. The system according to claim 25, wherein the cGAN-based machine-learning system further includes respective quantifier and classifier network blocks.

27. The system according to claim 26, wherein the quantifier network block is operative, based on cGAN outputs of the generator network block and ground truth image features of a set of target ground truth shapes, to learn and predict the mean depth and the orientation of the target object in a 3D plane.

28. The system according to claim 27, wherein the classifier network block is operative, based on cGAN outputs of the generator network block and supervised classification labels of a set of target ground truth shapes, to learn and automatically classify the target objects into different categories.

29. The system according to claim 28, wherein the generator network block includes an encoder-decoder architecture having encoder-decoder layers, and the generator network block is operative to use feedback from the discriminator network block to adjust weights of the generator network block encoder-decoder architecture encoder-decoder layers to learn and predict accurate 2D shapes.

30. The system according to claim 25, wherein the cGAN-based machine-learning system comprises one or more programmed processors.

31. A conditional generative adversarial network (cGAN)-based machine-learning system, comprising one or more processors programmed to use a machine-learning model to recover the high-spatial frequencies in imperceptible 3D mmWave shape data for a target object, and to reconstruct and display an accurate human-perceivable 2D shape for the target object, wherein the one or more processors are further programmed:

to provide respective generator and discriminator network blocks of the machine-learning model, which collectively generate a full 2D image of the target object based on the 3D mmWave shape data for a target object;

to provide respective quantifier and classifier network blocks of the cGAN-based machine-learning system; and for the classifier network block to determine its loss function calculated as:

$$L_{class}(G) = L_{cGAN} + \lambda_C \cdot L_C(G) + \lambda_B \cdot L_B(G), \text{ where}$$

$$L_C(G) = -\sum_{i=1}^{9} t_i \log(c(s_i)) \text{ and } L_B(G) = -(t_0 \log(p_0) + (1-t_0)\log(1-p_0))$$

where $c(s_i)$ and $t_i$ are the predicted and actual probabilities of $i^{th}$ class (categorical output), $p_0$ and $t_0$ are the predicted and actual probabilities of suspicious object (binary output), and the hyper-parameters ($\lambda_L$, $\lambda_F$, $\lambda_C$, $\lambda_B$) represent the networks' focus on shape reconstruction, features prediction, and classification.

32. The conditional generative adversarial network (cGAN)-based machine-learning system as in claim 31, wherein the one or more processors are further programmed to predict the 3D image features of the 2D shape of the target object.

33. The conditional generative adversarial network (cGAN)-based machine-learning system as in claim 32, wherein the 3D image features comprise at least one of the object categories, the mean depth, the azimuth angle, the elevation angle, and the rotation angle, of the image.

34. The conditional generative adversarial network (cGAN)-based machine-learning system as in claim 31, wherein the one or more processors are further programmed to implement within the generator network block an encoder-decoder architecture.

35. The conditional generative adversarial network (cGAN)-based machine-learning system as in claim 34, wherein the one or more processors are further programmed for the encoder to convert the 3D mmWave shape data into a 1D feature vector using multiple 3D convolution layers and an end flatten layer, so that the 1D representation compresses the 3D shape so that the deeper layers of the generator learn high-level abstract features.

36. The conditional generative adversarial network (cGAN)-based machine-learning system as in claim 35, wherein the one or more processors are further programmed to implement a skip connection between the generator network block and the discriminator network block.

37. The conditional generative adversarial network (cGAN)-based machine-learning system as in claim 36, wherein the one or more processors are further programmed to implement a skip connection which extracts a highest energy 2D slice from the 3D shape and concatenate it to a 2D deconvolution layer of the generator network block.

38. The conditional generative adversarial network (cGAN)-based machine-learning system as in claim 31, wherein the one or more processors are further programmed for the quantifier network block, based on cGAN outputs of the generator network block and ground truth image features of a set of target ground truth shapes, to learn and predict the mean depth and the orientation of the target object in the 3D plane.

39. The conditional generative adversarial network (cGAN)-based machine-learning system as in claim 31, wherein the one or more processors are further programmed for the classifier network block, based on cGAN outputs of the generator network block and supervised classification labels of a set of target ground truth shapes, to learn and automatically classify the target objects into different categories.

40. The conditional generative adversarial network (cGAN)-based machine-learning system as in claim 36, wherein the one or more processors are further programmed to implement a skip connection which enables the generator network block to use feedback from the discriminator network block to adjust weights of the generator network block encoder-decoder architecture encoder-decoder layers to learn and predict accurate 2D shapes.

41. The conditional generative adversarial network (cGAN)-based machine-learning system as in claim 31, wherein the network parameters of the generator network block comprise:

| | 3DC1 | 3DC2 | 3DC3 | 3DC4 | 3DC5 | 3DC6 | Output |
|---|---|---|---|---|---|---|---|
| Filter # | 16 | 32 | 64 | 128 | 256 | 1024 | |
| Filter Size | 6 × 6 × 6 | 6 × 6 × 6 | 6 × 6 × 6 | 6 × 6 × 6 | 6 × 6 × 6 | 6 × 6 × 6 | |
| Dilation | 2 × 2 × 2 | 2 × 2 × 2 | 2 × 2 × 2 | 2 × 2 × 2 | 2 × 2 × 2 | 2 × 2 × 2 | |
| Act. Fcn | LRelu | LRelu | LRelu | LRelu | LRelu | LRelu | Linear |

| | 2DDC1 | 2DDC2 | 2DDC3 | 2DDC4 | 2DDC5 | 2DDC6 | 2DDC7 | 2DDC8 | Output |
|---|---|---|---|---|---|---|---|---|---|
| Filter # | 1024 | 512 | 256 | 128 | 64 | 16 | 8 | 1 | |
| Filter Size | 4 × 3 | 4 × 4 | 4 × 4 | 4 × 4 | 4 × 4 | 4 × 4 | 4 × 4 | 4 × 4 | |
| Dilation | 1 × 2 | 2 × 2 | 2 × 2 | 2 × 2 | 2 × 2 | 2 × 2 | 2 × 2 | 2 × 2 | |
| Act. Fcn | Relu | Relu | Relu | Relu | Relu | Relu | Relu | Relu | Linear |

with 3DC: 3D Convolution (with batch normalization); 2DDC: 2D Deconvolution (with batch normalization); Act. Fcn: Activation Function; LRelu: LeakyRelu; and output layer using linear activation.

42. The conditional generative adversarial network (cGAN)-based machine-learning system as in claim 31, wherein the network parameters of the discriminator network block comprise:

| | 3DC1 | 3DC2 | 3DC3 | 3DC4 | 3DC5 | 3DC6 | FC1 | Output |
|---|---|---|---|---|---|---|---|---|
| Filter # | 16 | 32 | 64 | 128 | 256 | 1024 | | |
| Filter Size | 6 × 6 × 6 | 6 × 6 × 6 | 6 × 6 × 6 | 6 × 6 × 6 | 6 × 6 × 6 | 6 × 6 × 6 | | |

-continued

| | 3DC1 | 3DC2 | 3DC3 | 3DC4 | 3DC5 | 3DC6 | FC1 | Output |
|---|---|---|---|---|---|---|---|---|
| Dilation | 2 × 2 × 2 | 2 × 2 × 2 | 2 × 2 × 2 | 2 × 2 × 2 | 2 × 2 × 2 | 2 × 2 × 2 | | |
| Act. Fcn | LRelu | LRelu | LRelu | LRelu | LRelu | LRelu | Relu | Sigmoid |

| | 2DC1 | 2DC2 | 2DC3 | 2DC4 | 2DC5 | 2DC6 | 2DC7 | FC2 | FC3 | FC4 | Output |
|---|---|---|---|---|---|---|---|---|---|---|---|
| Filter # | 4 | 8 | 16 | 32 | 64 | 128 | 256 | | | | |
| Filter Size | 4 × 3 | 6 × 6 × 6 | 6 × 6 × 6 | 6 × 6 × 6 | 6 × 6 × 6 | 6 × 6 × 6 | 6 × 6 × 6 | | | | |
| Dilation | 2 × 2 | 2 × 2 | 2 × 2 | 2 × 2 | 2 × 2 | 2 × 2 | 2 × 2 | | | | |
| Act. Fcn | LRelu | LRelu | LRelu | LRelu | LRelu | LRelu | LRelu | Relu | Relu | Relu | Sigmoid |

with 3DC: 3D Convolution (with batch normalization); FC: Fully Connected; 2DC: 2D Convolution (with batch norm.); Act. Fcn: Activation Function; LRelu: LeakyRelu; and output layer using sigmoid activation.

43. The conditional generative adversarial network (cGAN)-based machine-learning system as in claim 31, wherein the network parameters of the quantifier network block comprise:

| | 2DC1 | 2DC2 | 2DC3 | 2DC4 | 2DC5 | 2DC6 | 2DC7 | FC1 | FC2 | FC3 | Output |
|---|---|---|---|---|---|---|---|---|---|---|---|
| Filter # | 4 | 8 | 16 | 32 | 64 | 128 | 256 | | | | |
| Filter Size | 4 × 3 | 6 × 6 × 6 | 6 × 6 × 6 | 6 × 6 × 6 | 6 × 6 × 6 | 6 × 6 × 6 | 6 × 6 × 6 | | | | |
| Dilation | 2 × 2 | 2 × 2 | 2 × 2 | 2 × 2 | 2 × 2 | 2 × 2 | 2 × 2 | | | | |
| Act. Fcn | LRelu | LRelu | LRelu | LRelu | LRelu | LRelu | LRelu | Relu | Relu | Relu | Linear |

with 2DC: 2D Convolution (with batch normalization); FC: Fully Connected; Act. Fcn: Activation Function; LRelu: LeakyRelu; and output layer using linear activation.

44. The conditional generative adversarial network (cGAN)-based machine-learning system as in claim 31, wherein the network parameters of the classifier network block comprise:

| | 2DC1 | 2DC2 | 2DC3 | 2DC4 | 2DC5 | 2DC6 | 2DC7 | FC1 | FC2 | FC3 | Category Output | Binary Output |
|---|---|---|---|---|---|---|---|---|---|---|---|---|
| Filter # | 4 | 8 | 16 | 32 | 64 | 128 | 256 | | | | | |
| Filter Size | 4 × 3 | 6 × 6 × 6 | 6 × 6 × 6 | 6 × 6 × 6 | 6 × 6 × 6 | 6 × 6 × 6 | 6 × 6 × 6 | | | | | |
| Dilation | 2 × 2 | 2 × 2 | 2 × 2 | 2 × 2 | 2 × 2 | 2 × 2 | 2 × 2 | | | | | |
| Act. Fcn | LRelu | LRelu | LRelu | LRelu | LRelu | LRelu | LRelu | Relu | Relu | Relu | Softmax | Sigmoid |

with 2DC: 2D Convolution (with batch normalization); FC: Fully Connected; Categorical class output layer uses softmax and Binary output layer using sigmoid activation functions.

45. The conditional generative adversarial network (cGAN)-based machine-learning system as in claim 31, wherein the one or more processors are further programmed for the generator and discriminator network blocks to use the $L_1$-norm loss $L_1(G)$ and traditional GAN loss $L(G)$ to train the cGAN-based system comprising the generator and discriminator network blocks, with combined cGAN-based system loss determined by:

$$L_{cGAN}=L(G)+\lambda_L\cdot L_1(G),\text{ where } L_1(G)=E\|x_L-G(z_L)\|_1.$$

46. The conditional generative adversarial network (cGAN)-based machine-learning system as in claim 31, wherein the one or more processors are further programmed for the quantifier network block to determine its loss function:

$$L_Q=L_{cGAN}+\lambda_F\cdot L_F(G),\text{ where } L_F(G)=E\|x_F-G(z_F)\|_1.$$

* * * * *